(12) United States Patent
Baudoin et al.

(10) Patent No.: US 11,342,967 B2
(45) Date of Patent: May 24, 2022

(54) METHOD AND SYSTEM FOR ESTIMATING ATTENUATIONS OF THE RESPECTIVE UPLINKS OF NOMINAL SATELLITE ACCESS STATION(S) TO A VHTS VERY HIGH THROUGHPUT TELECOMMUNICATIONS SATELLITE

(71) Applicant: THALES, Courbevoie (FR)

(72) Inventors: Cédric Baudoin, Toulouse (FR); Sandra Vime, Toulouse (FR); Bertrand Onillon, Toulouse (FR); Hélène Gachon, Toulouse (FR); Cécile Larue De Tournemine, Toulouse (FR); Philippe Voisin, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/293,427

(22) PCT Filed: Oct. 23, 2019

(86) PCT No.: PCT/EP2019/078795
§ 371 (c)(1),
(2) Date: May 12, 2021

(87) PCT Pub. No.: WO2020/099077
PCT Pub. Date: May 22, 2020

(65) Prior Publication Data
US 2022/0029664 A1  Jan. 27, 2022

(30) Foreign Application Priority Data

Nov. 15, 2018 (FR) .................................... 1871837

(51) Int. Cl.
*H04L 5/12* (2006.01)
*H04L 23/02* (2006.01)
(Continued)

(52) U.S. Cl.
CPC .......... *H04B 7/024* (2013.01); *H04B 7/1851* (2013.01); *H04B 7/18526* (2013.01); *H04B 7/2041* (2013.01)

(58) Field of Classification Search
CPC .. H04B 7/024; H04B 7/1851; H04B 7/18526; H04B 7/2041
(Continued)

(56) References Cited

U.S. PATENT DOCUMENTS 10,686,518 B2 * 6/2020 Motoyoshi ......... H04B 7/18523
10,735,089 B2 * 8/2020 Mendelsohn ...... H04B 7/18513
(Continued)

FOREIGN PATENT DOCUMENTS

EP   3 079 612 A1   5/1983
FR   3 051 618 A1   11/2017
(Continued)

*Primary Examiner* — Tanmay K Shah
(74) *Attorney, Agent, or Firm* — BakerHostetler

(57) ABSTRACT

A method for estimating, at one and the same given time, a set of attenuations of one or more first radiofrequency RF uplinks, implemented by a VHTS space telecommunications system. In an auxiliary usage step, an on-board regenerative or digital transparent processor DTP generates at least one beacon signal that is or are distributed, in the Q band, to N nominal access stations GWn(i) in order to be measured in terms of power, or measures the spectral power of each traffic signal transmitted by the nominal access stations GWn(i), i varying from 1 to N. In a following step, the attenuation levels An(i) of the uplinks LUn(i) are determined based on the powers of the one or more beacon signals that are measured on the corresponding downlinks LDn(i) in the Q band, or based on the one or more spectral powers, measured by the DTP, of the traffic signals received on the one or more uplinks LUn(i).

14 Claims, 6 Drawing Sheets

(51) Int. Cl.
*H04B 7/024* (2017.01)
*H04B 7/185* (2006.01)
*H04B 7/204* (2006.01)

(58) Field of Classification Search
USPC .......................................................... 375/262
See application file for complete search history.

(56) References Cited

U.S. PATENT DOCUMENTS

2013/0109299 A1* 5/2013 Roos ................. H04B 7/18513
  455/12.1
2019/0222279 A1* 7/2019 Xi ........................ H04B 7/0695
2019/0245613 A1* 8/2019 Roy .................... H04L 61/2007

FOREIGN PATENT DOCUMENTS

WO 2011/016060 A1 2/2011
WO 2019/219275 A1 11/2019

* cited by examiner

METHOD AND SYSTEM FOR ESTIMATING ATTENUATIONS OF THE RESPECTIVE UPLINKS OF NOMINAL SATELLITE ACCESS STATION(S) TO A VHTS VERY HIGH THROUGHPUT TELECOMMUNICATIONS SATELLITE

CROSS-REFERENCE TO RELATED APPLICATIONS

This application is a National Stage of International patent application PCT/EP2019/078795, filed on Oct. 23, 2019, which claims priority to foreign French patent application No. FR 1871837, filed on Nov. 15, 2018, the disclosures of which are incorporated by reference in their entirety.

FIELD OF THE INVENTION

The present invention relates to a method for estimating the attenuations of respective first very high throughput telecommunications uplinks between a set of one or more first nominal satellite access stations GWn and one and the same VHTS (for "very high throughput satellite") very high throughput telecommunications satellite that make it possible to predict switching times for the switching of very high throughput data traffic to be performed from at least one nominal satellite access station of the set of the one or more first nominal satellite access stations GWn to at least one second diversity satellite access station GWp via one or more corresponding second RF uplinks attached to said same VHTS satellite.

The present invention also relates to a method for predicting the switching times for the switching of very high throughput data traffic to be performed by a VHTS very high throughput space telecommunications system, the VHTS space telecommunications system including the VHTS satellite and at least one first and at least one second access station, GWn, GWp, and the method for predicting the switching times using the method, according to the invention, for estimating the attenuations of the one or more first radiofrequency RF telecommunications uplinks.

The present invention also relates to a VHTS very high throughput satellite space telecommunications system, configured, so as to implement said method for estimating the attenuations of the first nominal VHTS uplinks and the method for predicting the switching times for the switching of traffic from at least one nominal VHTS RF uplink to at least one second diversity VHTS RF uplink.

BACKGROUND

VHTS very high throughput telecommunications systems are characterized by very large telecommunications capacities. In order to limit the number of satellite access stations GW (for "gateway(s)"), the use of very high frequency Q/V bands, or even other higher bands such as for example the W band, is a major advantage since these make it possible to significantly increase the bandwidth allocated per access station and therefore the throughput of the data traffic being routed.

Using these very high frequency Q/V bands involves implementing spatial diversity mechanisms in order to combat the very large radio transmission attenuations observed in these bands.

Moreover, as described in the French patent application, entitled "Procédé de gestion du trafic de données de télécommunications átrès haut débit par satellite(s)" [Method for managing the telecommunication data traffic of a very high throughput satellite communication system] and filed on May 17, 2018 under number 1800480, various diversity techniques, may be used.

For example, a first technique, called "RF station redundancy" and illustrated in FIG. 1, makes it possible to implement a strategy of managing spatial or geographic diversity, and a second technique, called "flexible diversity" (or "smart diversity") and illustrated in FIG. 2, makes it possible to implement a strategy of managing traffic load diversity.

These diversity techniques have to be configured so as to limit the impact on the telecommunications service to the greatest possible extent, whether in terms of duration of service interruption or in terms of capacity reduction, while at the same time having a low cost.

These diversity techniques all use a method for predicting the switching times for the switching of very high throughput data traffic between at least one first nominal traffic uplink and at least one second diversity traffic uplink, the first nominal uplink being configured so as to route the very high throughput data traffic from a first nominal satellite access station to a VHTS very high throughput satellite, and the second diversity uplink being configured so as to route the very high throughput data traffic from a second diversity satellite access station to said same VHTS very high throughput satellite.

The method for predicting the switching times for the switching of the VHTS data traffic is configured so as and used to:

in the first "RF station redundancy" technique illustrated in FIG. 1, implement site diversity n+p where it should be possible to synchronously switch the ground segment, that is to say be possible to switch the VHTS data traffic from the nominal access station GWn to the diversity access station GWp and vice versa, and also be possible to switch the corresponding transmission paths within the telecommunications payload of the satellite, or in the second "smart diversity" technique illustrated in FIG. 2, trigger traffic or traffic load handovers of user service terminals from a loaded first satellite access station to at least one second diversity satellite access station that is not subjected to rain and that is capable of managing some or all of the load of the first access station in the context of smart load diversity management.

At present and as is known, two techniques for performing the method for predicting the switching times for the switching of VHTS data traffic are used.

A first technique is based on a weather forecast for the environment and uses weather forecasting models. This first technique has a good anticipation window, typically of a duration of between one hour and six hours, but provides a poor and rough estimate of the attenuations of the traffic uplinks of the satellite access stations since it makes it possible to discriminate only between a rainy environment and a clear sky environment. Moreover, the operational implementation of this first technique is difficult because it is necessary for the satellite access stations to access an auxiliary telecommunications network, connected to weather observation databases, and because the availability of weather data in certain geographical regions, including in Europe, is not always guaranteed.

A second technique is based on estimating the attenuations of the traffic uplinks of the satellite access stations through measurements, by each satellite access station, of a downlink RF beacon in the Ka band, transmitted by the satellite in a global transmission satellite spot or in a local transmission satellite spot that is different per satellite access station. This second technique provides estimates of the attenuations of the uplinks of the satellite access stations that are more accurate than those provided by the first prediction technique. Moreover, this second technique has an anticipation window that is shorter than the one that the first technique has but that remains compatible with an additional high throughput remote control link, sometimes referred to as "Hilink", different from the conventional remote control and telemetry link of a satellite. The duration of the anticipation window that the second prediction technique has is typically equal to 5 minutes.

However, this technique requires the addition of additional on-board equipment for generating a beacon and an omnidirectional antenna in the case of global coverage, and, even though this second prediction technique improves the accuracy of the estimate of satellite access station uplink attenuations, a non-negligible error varying from 1 to 2 dB affects the estimate of the traffic uplink attenuation in the V band when continuing to use the current beacon transmitter that operates in the Ka band. Specifically, the absence of sufficient knowledge with regard to the correlation between the attenuation laws of the propagation modes of radio signals in the V band and in the Ka band makes it difficult to transpose an estimator of the attenuation in the Ka band for an attenuation in the V band without a notable error.

The above-described first and second techniques for predicting satellite access station uplink attenuations therefore do not meet the requirements of VHTS telecommunications systems in a completely satisfactory manner.

A first technical problem solved by the invention is to increase the accuracy, reliability and robustness of a method for estimating the attenuations of respective very high throughput telecommunications uplinks between a first nominal satellite access station GWn and a VHTS very high throughput telecommunications satellite, and between a second diversity satellite access station GWp and said same VHTS satellite, while at the same time limiting the additions and additional modifications of hardware that are necessary to achieve this diversity and generate an additional cost.

A second technical problem, related to the second problem and solved by the invention, is to provide a reliable and robust method for predicting the switching times for the switching of very high throughput data traffic between a serving first nominal satellite access station GWn and a second diversity satellite access station GWp while at the same time limiting the additions and additional modifications of hardware that are necessary to achieve this diversity and generate an additional cost.

SUMMARY OF THE INVENTION

To this end, one subject of the invention is a method for estimating, at a given time, a set of attenuations of one or more first very high throughput radiofrequency RF telecommunications uplinks connecting one or more first nominal satellite access stations to one and the same VHTS very high throughput telecommunications satellite. The method for estimating the set of one or more attenuations of the one or more first radiofrequency RF uplinks is implemented by a VHTS space telecommunications system comprising: a VHTS very high throughput telecommunications satellite; a predetermined whole number N, greater than or equal to 1, of first nominal satellite access stations $GWn(i)$, i being a first index varying from 1 to N; and a predetermined number P, greater than or equal to 1, of second diversity satellite access stations $GWp(j)$, j being a second index varying from 1 to P; and a plurality of user terminals, and a space telecommunications system control and coordination station, configured so as to manage diversity, each first nominal satellite access station $GWn(i)$ having a first very high throughput traffic uplink $LUn(i)$ operating in an uplink transmission band and, in association, a first very high throughput traffic downlink $LDn(i)$ operating in the Q band.

The VHTS space telecommunications satellite comprises a payload having:

an antenna system for generating reception and transmission satellite spots associated with the one or more first and second access stations and transmission and reception spots associated with the user terminals, and a regenerative or digital transparent processor DTP, configured primarily so as to provide high-degree connectivity and high-degree flexibility for the allocation of frequency slots to the reception and transmission satellite spots for the first and second access stations and to the transmission and reception satellite spots for the user terminals.

The method for estimating the set of attenuations characterized in that it comprises:

an auxiliary step of using the digital transparent processor DTP, in which:

the digital processor generates a common beacon signal or a plurality of different beacon signals and distributes it/them, via a number S of transmission satellite spots in the Q band, greater than or equal to 1 and less than or equal to N, to the N one or more first radiofrequency RF downlinks $LDn(i)$, i varying from 1 to N in order to be, measured in terms of power, or the digital processor measures, for each first uplink $LUn(i)$, i varying from 1 to N, a spectral power of the very high throughput traffic signal received by the satellite corresponding to the traffic signal transmitted by the corresponding first nominal satellite access station $GWn(i)$; and a following step of determining the attenuation levels $An(i)$ of the uplinks, i varying from 1 to N, based on the powers of the beacon signal or signals measured by the one or more first nominal access stations $GWn(i)$, or based on the one or more spectral powers, measured by the digital processor, of the traffic signals received by the satellite and transmitted by the one or more first nominal access stations $GWn(i)$.

According to some particular embodiments, the method for estimating, at a given time, a set of attenuation levels of one or more first very high throughput radiofrequency RF telecommunications uplinks connecting one or more first nominal satellite access stations to one and the same VHTS very high throughput telecommunications satellite comprises one or more of the following features, taken on their own or in combination:

the estimation method comprises, according to a first type of estimation: a first first step in which the digital processor generates a common beacon signal or a plurality of different beacon signals, and then a first second step in which the digital processor routes the one or more beacon signals that are generated to a set of baseband or intermediate frequency band transmission chains that are connected to the transmission satellite spots of the first nominal satellite access stations $GWn(i)$, varying from 1 to N, through output Q-band RF conversion chains; and then a first third step in which a beacon signal, taken from among the one or more beacon signals, generated and converted into the Q band, is sent to each first satellite access station $GWn(i)$, i varying from 1 to N, through the transmission satellite spot and the first downlink. LDn(i) of said first nominal satellite access station GWn(i); and then a first fourth step in which each first satellite access station GWn(i), i varying from 1 to N, accurately measures the power of the beacon signal transmitted by the satellite on its downlink LDn(i), deduces therefrom the attenuation of the first downlink in the Q band and then determines, through a predetermined statistical correlation method, an attenuation level An(i) of the corresponding first uplink LUn(i) in the uplink transmission band;

the digital processor reuses a multicast module to route the one or more beacon signals that are generated to the set of baseband or intermediate frequency band transmission chains that are connected to the transmission satellite spots of the first nominal satellite access stations through output Q-band RF conversion chains;

the transmission band of the first uplinks of the first access stations is a band contained in the Ka band and the V band;

the estimation method comprises, according to a second type of estimation: a second first step in which each first satellite access station GWn(i), i varying from 1 to N, transmits, to the VHTS satellite (204), a different data traffic signal on its first uplink LUn(i); and then a second second step in which the digital processor measures, for each first uplink LUn(i), i varying from 1 to N, a spectral power of the very high throughput traffic signal sent by the corresponding first nominal satellite access station GWn(i); and then a second third step in which the digital processor transmits the measured spectral powers of the VHTS traffic signals to an estimation computer for estimating the attenuations of the uplinks LUn(i), i varying from 1 to N, the estimation computer being located on the ground or on board the satellite: and then a second fourth step in which the estimation computer for estimating the attenuations estimates, based on each measured spectral power of the traffic signal on an uplink LUn(i), varying from 1 to N, a corresponding attenuation level An(i);

in the second second step, only a few elementary bands of the uplink traffic signal transmitted from each first satellite access station GWn(i), for i varying from 1 to N, are measured in terms of spectral power by the digital transparent processor by scanning a predetermined whole number between 1 from 100, and/or, in the second third step, the measured spectral powers are recovered cyclically with a short period, between 0.05 and 10 seconds, preferably between 0.1 and 1 second, by an on-board telemetry subsystem of the satellite;

when the spectral powers measured by the digital processor are cyclically recovered by an on-board telemetry subsystem of the satellite, the on-board telemetry subsystem comprises only a conventional first low throughput telemetry device, including the remote measurements of the platform and of the VHTS payload, or comprises a conventional first low throughput telemetry device and an auxiliary second high throughput telemetry device (Hilink) dedicated to the remote measurements of the VHTS payload, the telemetry subsystem being configured so as to transmit the remote measurements of the spectral powers to the estimation computer, located on the ground, or the on-board telemetry subsystem comprises a conventional first low throughput telemetry device and an auxiliary second high throughput telemetry device (Hilink) dedicated to the remote measurements of the VHTS payload, the auxiliary second high throughput telemetry device including the estimation computer and being configured so as to transmit the computed attenuation levels A(i) of the uplinks LUn(i), i varying from 1 to N, to the ground.

Another subject of the invention is a method for predicting the switching times for the switching of VHTS very high throughput data traffic from, a set of at least one nominal satellite access station to at least one diversity satellite access satellite station, the method for predicting the switching times for the switching of VHTS very high throughput data traffic of the switching times for the switching of VHTS very high throughput data traffic from a set of nominal satellite access stations being implemented by a VHTS very high throughput space telecommunications system comprising: a VHTS very high throughput telecommunications satellite; a predetermined whole number N, greater than or equal to 1, of first nominal satellite access stations GWn(i), i being a first index varying from 1 to N, and a predetermined number P, greater than or equal to 1, of second diversity satellite access stations GWp(j), j being a second index varying from 1 to P; and a plurality of user terminals; and a space telecommunications system control and coordination station, configured so as to manage diversity; each first nominal satellite access station GWn(i) having a first very high throughput traffic uplink LUn(i) operating in an uplink transmission band and, in association, a first very high throughput traffic downlink LDn(i) operating in the Q band; and each second diversity satellite access station GWp(j), j varying from 1 to P, having a second very high throughput traffic nominal uplink LUp(j) operating in an uplink transmission band and, in association, a second very high throughput traffic downlink operating in the Q band. The method for predicting the switching times for the switching of very high throughput data traffic from a set of nominal satellite access stations to at least one diversity satellite access satellite station is characterized in that it comprises: a step of estimating, at a succession of given times tk, for each time tk, the attenuation level Ank(i) of each first nominal satellite access station GWn(i), i varying from 1 to N, the step of estimating the attenuation levels Ank(i) of the uplinks LUn(i) at one and the same time tk being defined above, and then a step of determining the switching times for the switching of very high throughput data traffic from the set of nominal satellite access stations GWn(i), i varying from 1 to N, wherein a decision is made, at each time tk and for each nominal satellite access station GWn(i), i varying from 1 to N, whether or not it is opportune to switch the data traffic on the basis of the attenuation level Ank(i) estimated at the time tk of the uplink LUn(i) of said corresponding first nominal station GWn(i).

According to some particular embodiments, the method for predicting the switching times for the switching of VHTS very high throughput data traffic from a set of at least one nominal satellite access station to at least one diversity satellite access satellite station comprises one or more of the following features taken on their own or in combination:

when it is decided, at a time tk0, to switch the traffic for a station GWn(i0), i0 being between 1 and N, the switching time tc(i0) is then a time that is delayed with respect to the time tk0 by a period compatible with the duration to implement diversity with respect to the nominal satellite access station GWn(i0).

Another subject of the invention is a very high throughput space telecommunications system for estimating, at one and the same given time, a set of attenuation levels of one or more first very high throughput radiofrequency RF telecommunications uplinks connecting one or more first nominal satellite access stations to one and the same VHTS very high throughput telecommunications satellite; a predetermined whole number N, greater than or equal to 1, of first nominal satellite access stations GWn(i), i being a first index varying from 1 to N; and a plurality of user terminals, and a space telecommunications system control and coordination station, configured so as to manage diversity; each first nominal satellite access station GWn(i) having a first very high throughput traffic uplink LUn(i) operating in an uplink transmission band and, in association, a first very high throughput traffic downlink LDn(i) operating in the Q band; and the VHTS telecommunications satellite comprising a payload having: an antenna system for generating reception and transmission satellite spots associated with the one or more first nominal access stations and transmission and reception spots associated with the user terminals, and a regenerative or digital transparent processor DTP, configured primarily so as to provide high-degree connectivity and high-degree flexibility for the allocation of frequency slots to the reception and transmission satellite spots for the one or more first nominal access stations and to the transmission and reception satellite spots for the user terminals. The VHTS very high throughput space telecommunications system is characterized in that the digital processor is configured so as to generate a common beacon signal or a plurality of different beacon signals and distributes it/them, via a number S of transmission satellite spots in the band, greater than or equal to 1 and less than or equal to N, to the N first radiofrequency RF downlinks MO), i varying from 1 to N, in order to be measured in terms of power, or the digital processor is configured so as to measure, for each first nominal satellite access station GWn(i), i varying from 1 to N, a spectral power of the very high throughput traffic signal transmitted on the associated first uplink LUn(i).

According to some particular embodiments, the VHTS very high throughput space telecommunications system comprises one or more of the following features, taken on their own or in combination:

the digital processor is configured so as to generate, in a first first step, a common beacon signal or a plurality of different beacon signals, and then, in a first second step, route the one or more beacon signals that are generated to a set of baseband or intermediate frequency band transmission chains that are connected to the transmission satellite spots of the first nominal satellite access stations GWn(i), i varying from 1 to N, through output Q-band RF conversion chains; and the antenna system for generating reception and transmission satellite spots associated with the one or more first nominal access stations is configured so as to send, in a first third step, a beacon signal, taken from among the one or more beacon signals, generated and converted into the Q band, to each first satellite access station GWn(i), i varying from 1 to N, through the transmission satellite spot and the first downlink LDn(i) of said first nominal satellite access station GWn(i); and each first satellite access station GWn (i), i varying from 1 to N, is configured so as to accurately measure, in a first fourth step, the power of the beacon signal transmitted by the satellite on its downlink LDn(i), and to deduce therefrom the attenuation of the first downlink in the Q band, and then determine, through a predetermined statistical correlation method, an attenuation level An(i) of the corresponding first uplink LUn(i) in the uplink transmission band;

each first satellite access station GWn(i), i varying from 1 to N, is configured, in a second first step, so as to transmit, to the VHTS satellite, a different data traffic signal on its first uplink LUn(i); and the digital processor is configured so as to: measure, in a second second step following the first step, for each first uplink LUn(i), i varying, from 1 to N, a spectral power of the very high throughput traffic signal sent by the first nominal satellite access station GWn(i), and then transmit, in a second third step, the measured spectral powers of the VHTS traffic signals to an estimation computer (266) for estimating the attenuations of the uplinks, located on the ground or on board the satellite, the estimation computer for estimating the attenuations being configured so as to estimate, based on each measured spectral power of the traffic signal on an uplink LUn(i), i varying from 1 to N, a corresponding attenuation level An(i);

the VHTS very high throughput telecommunications satellite comprises an on-board telemetry subsystem, the on-board telemetry subsystem comprising only a conventional first low throughput telemetry device, including the remote measurements of the platform and of the VHTS payload, or comprising a conventional first low throughput telemetry device and an auxiliary second high throughput telemetry device (Hilink) dedicated to the remote measurements of the VHTS payload, and the telemetry subsystem being configured so as to transmit the remote measurements of the spectral powers to the estimation computer, located on the ground; or the on-board telemetry subsystem comprising a conventional first low throughput telemetry device and an auxiliary second high throughput telemetry device (Hilink) dedicated to the remote measurements of the VHTS payload, the auxiliary second high throughput telemetry device including the estimation computer and being configured so as to transmit the attenuation levels An(i) of the uplinks LUn(i), i varying from 1 to N, to the ground;

the VHTS very high throughput space telecommunications system defined above furthermore comprises a predetermined number P, greater than or equal to 1, of second diversity satellite access stations GWp(j), j being a second index varying from 1 to P; and the antenna system is configured so as to generate reception and transmission satellite spots associated with the one or more first and second access stations GWn(i), GWp(j) and transmission and reception spots associated with the user terminals; and the space telecommunications system and diversity management control and coordination station is configured so as to predict switching times for the switching of very high throughput data traffic from a set of nominal satellite access stations to at least one diversity satellite access station by receiving the estimates, at a succession of given times tk, for each time tk, of the attenuation level Ank(i) of each first nominal satellite access station GWn(i), i varying from 1 to N, and then by determining the switching times for the switching of very high throughput data traffic from the set of first nominal satellite access stations GWn(i), i varying from 1 to N, by deciding, at each time tk and for each satellite access station GWn(i), i varying from 1 to N, whether or not it is opportune to switch the data traffic on the basis of the attenuation level Ank(i) estimated at the time tk of the uplink LUn(i) of said first nominal station GWn(i).

BRIEF DESCRIPTION OF THE DRAWINGS

The invention will be better understood on reading the following description of a number of embodiments, which description is given solely by way of example and with reference to the drawings, in which.

DETAILED DESCRIPTION

The basic principle of the invention is based on using a regenerative or digital transparent processor DTP to directly or indirectly measure the power of the access uplink from the access ground station to the VHTS telecommunications satellite. This consists in:

generating beacons in the Q band on board the satellite in order to determine the attenuation on the uplink on the ground, or alternatively determining, using the frequency spectrum measurements performed on the input ports of the one or more access stations GW, the times at which diversity should be implemented, that is to say the times at which access stations GW masked or subjected to interference by clouds or rain should be handed over in terms of site diversity n+p.

In the alternative solution, the measurement may be performed on a subset of elementary bands at the rate of a few elementary bands per access station GW, and the elementary measurements forming a spectral analysis may then be sent to the ground so as to form the estimator of the method or processed on board the satellite, for example by a high throughput telemetry module, for example the module referred to as "hilink" on certain satellite systems.

Figure 1:
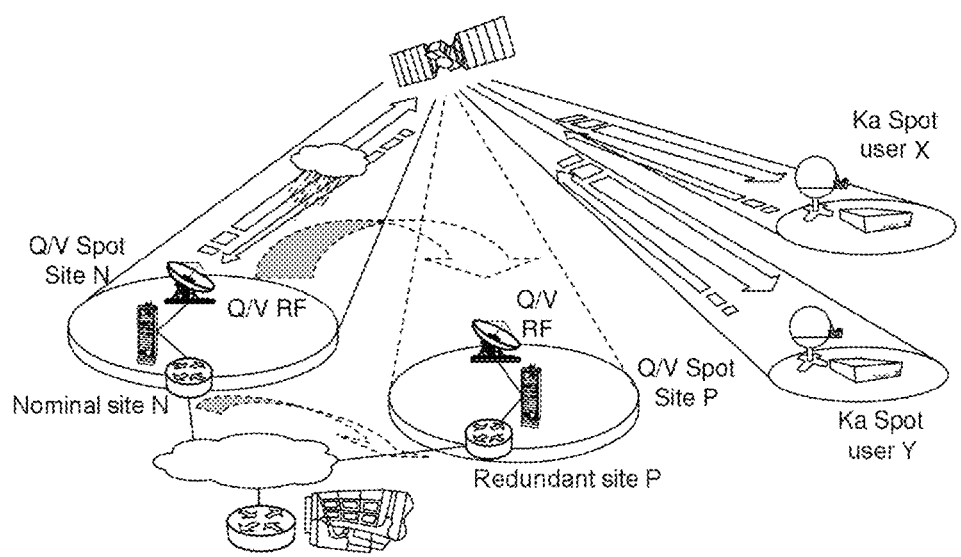
FIG. 1 is a general view of the architecture of a VHTS very high throughput space telecommunications system that implements a first diversity technique, called "RF station redundancy" and forming part of the prior art.
Figure 2:
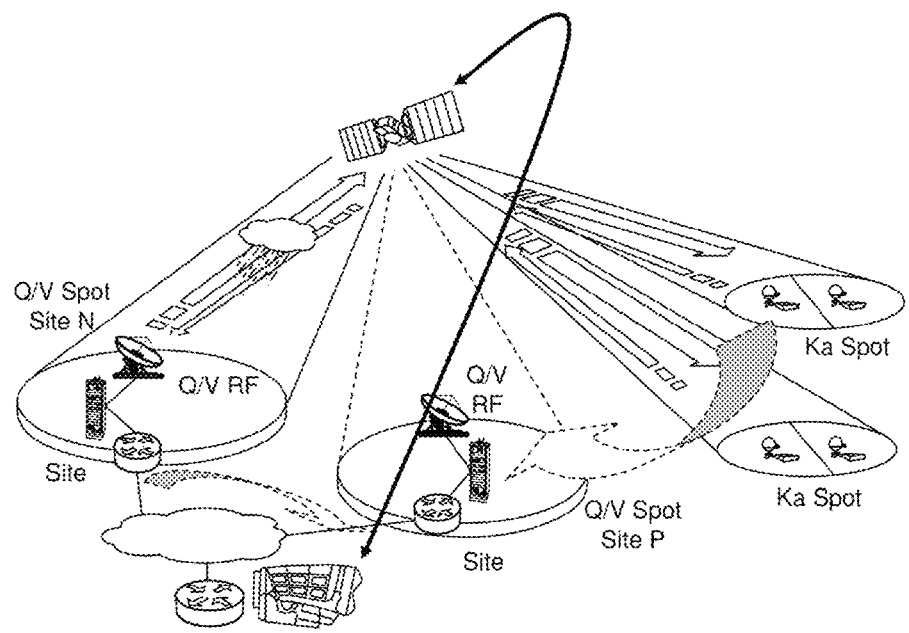
FIG. 2 is the general architecture of a VHTS very high throughput space telecommunications system that implements a second diversity technique, called "flexible or smart diversity" and forming part of the prior art.
Figure 3:
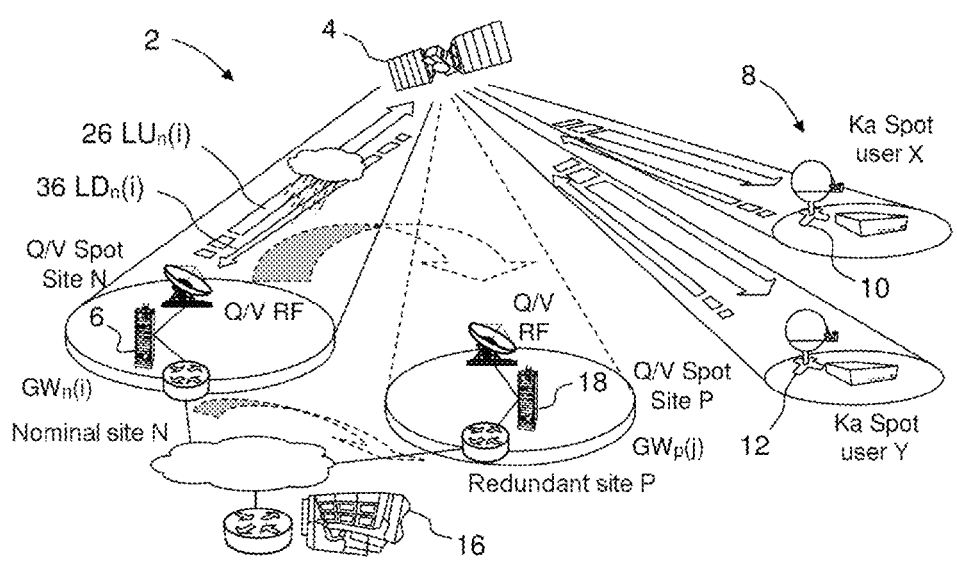
FIG. 3 is a general view of the architecture of a VHTS very high throughput space telecommunications system according to the invention for estimating, at one and the same given time, a set of attenuation levels of one or more first very high throughput radiofrequency RF telecommunications uplinks connecting one or more first nominal satellite access, stations to one and the same VHTS very high throughput telecommunications satellite.

According to FIG. 3, a VHTS very high throughput space telecommunications system 2 is configured so as to estimate, at one and the same given time, a set of attenuation levels of one or more first very high throughput radiofrequency RF telecommunications uplinks connecting one or more first nominal satellite access stations to one and the same VHTS very high throughput telecommunications satellite.

The VHTS telecommunications system 2 comprises:

a VHTS very high throughput telecommunications satellite 4;

a predetermined whole number N, greater than or equal to 1, of first nominal satellite access stations 6 GWn(i), i being a first index varying from 1 to N; and a plurality 8 of user terminals 10, 12, and s space telecommunications system 2 control and coordination station 16, configured so as to manage diversity, and a predetermined number P, greater than or equal to 1, of second diversity satellite access stations 18 GWp(j), j being a second index varying from 1 to P.

In this case, for the purpose of making FIG. 3 easier to read, a single first nominal satellite access station is illustrated and denoted by the reference numeral 6 or GWn(i), i denoting a first generic index for running through all of the first nominal satellite access stations. For the same, purpose of making FIG. 3 easier to read, a single second diversity satellite access station is illustrated and denoted by the reference numeral 18 or GWp(j), j denoting a second generic index for all of the second diversity satellite access stations.

Each first nominal satellite access station Gn(i), i varying from 1 to N, comprises a first very high throughput traffic uplink, denoted by LUn(i) and by the reference 26 in FIG. 3, and operating in an uplink transmission band. A first very high throughput traffic downlink LDn(i) operating in the Q band is associated with the first very high throughput traffic uplink LUn(i).

Figure 4:
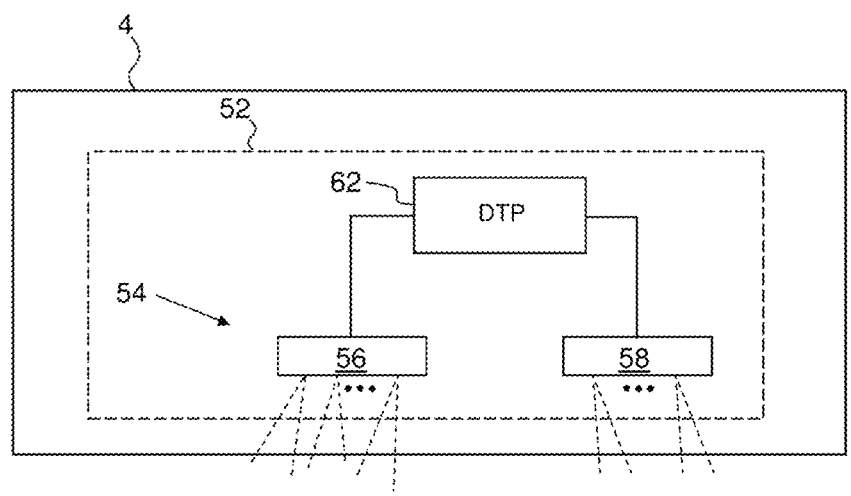
FIG. 4 is a general view of the architecture of the VHTS satellite used in the VHTS very high throughput space telecommunications system according to the invention from FIG. 3.

According to FIG. 4, the VHTS space telecommunications satellite 4 comprises a payload 52 having:

an antenna 56, 58 system 54 for generating reception and transmission satellite spots, associated with the one or more first nominal access stations GWn(i), i varying from 1 to N, and with the one or more second diversity access stations GWp(j), j varying from 1 to P, and transmission and reception spots associated with the user terminals 10, 12 of the plurality 8, and a digital processor, in this case a digital transparent processor DTP 62, configured primarily so as to provide high-degree connectivity and high-degree flexibility for the allocation of frequency slots to the reception and transmission satellite spots for the one or more first nominal access stations and the one or more second diversity access stations, and to the transmission and reception satellite spots for the user terminals.

According to FIG. 4, the digital transparent processor DTP 62 is configured so as to generate a common beacon signal or a plurality of different beacon signals and distributes it/them, via a number S of transmission satellite spots in the Q band, greater than or equal to 1 and less than or equal to N, to the N first radiofrequency RF downlinks LDn(i), i varying from 1 to N, in order to be measured in terms of power, or the digital transparent processor DTP 62 is configured so as to measure, for each first nominal satellite access station GWn(i), i varying from 1 to N, a spectral power of the very high throughput traffic signal on the associated first uplink LUn(i).

As a variant, the digital transparent processor DTP 62 may be replaced with a regenerative digital processor in which the telecommunications signals are demodulated.

Figure 5:
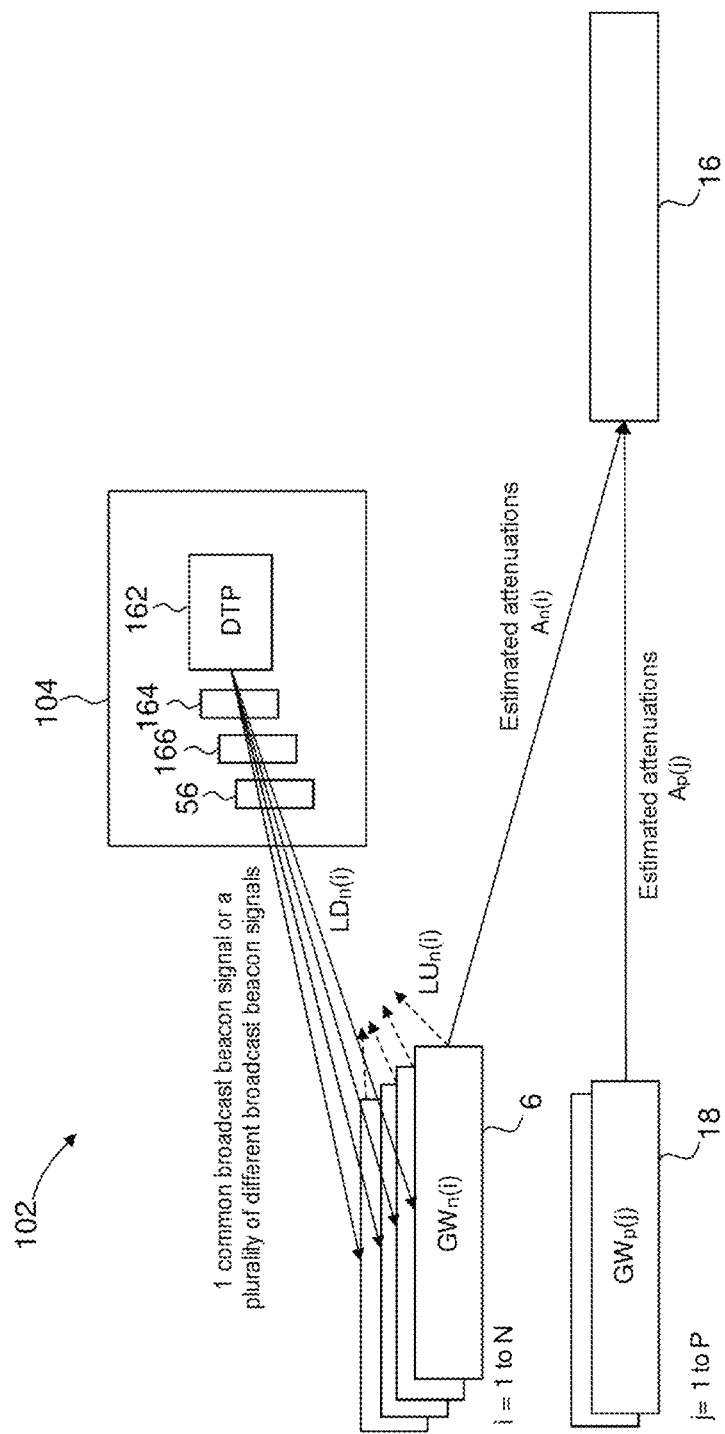
FIG. 5 is a view of the architecture and operation of a first embodiment of the VHTS very high throughput space telecommunications system from FIG. 3.

According to FIG. 5 and a first particular embodiment 102 of the VHTS telecommunications system according to the invention, the VHTS telecommunications satellite 4 is a VHTS telecommunications satellite 104 in which the digital processor DTP 62 is a digital transparent processor DTP 162, configured so as to generate, in a first step, a common beacon signal or a plurality of different beacon signals, and then, in a second step, route the one or more beacon signals that are generated to a set 164 of baseband or intermediate frequency band transmission chains that are connected to the transmission satellite spots of the first nominal satellite access stations through output Q-band RF conversion chains 166.

The antenna system 54, 56 for generating reception and transmission satellite spots associated with the one or more first nominal access stations is configured so as to send, in a third step, a beacon signal, taken from among the one or more beacon signals, generated and converted into the Q band, to each first satellite access station GWn(i), i varying from 1 to N, through the transmission satellite spot and the first downlink LD(i) of said first nominal satellite access station GWn(i): and Furthermore, according to the first embodiment 102 of the VHTS telecommunications system, each first satellite access station GWn(i), i varying from 1 to N, is configured so as to accurately measure, in a fourth step, the power of the beacon signal transmitted by the satellite on its downlink, and deduce therefrom the attenuation of the first downlink in the Q band, and then determine, through a predetermined statistical correlation method, an attenuation level AO) of the corresponding first uplink LUn(i) in the uplink transmission band.

Preferably, the digital processor DTP 162 is configured so as to generate, in the first step, a common beacon signal, and then, in a second step, route the beacon signal that is generated to the set 164 of baseband or intermediate frequency band transmission chains that are connected to the transmission satellite spots of the first nominal satellite access stations GWn(i) through output Q-band RF conversion chains 166.

As a variant, the digital processor DTP 162 is configured so a to generate, in the first step, a plurality of different beacon signals, and then, in a second step, route the beacon signals that are generated to the set 164 of baseband or intermediate frequency band transmission chains that are connected to the transmission satellite spots of the first nominal satellite access stations GWn(i) through output Q-band RF conversion chains 166. The different beacon signals that are generated are preferably distributed, before transposition into the RF output Q band, in elementary sub-bands of the baseband or of the intermediate frequency band that are furthest from one another, for example at the edges of the band and in the middle of the band when three different beacon signals are generated. This makes it possible to minimize frequency similarity errors. In addition, the values of the frequencies of the different beacon signals that are generated may vary over time, in a programmed manner, during the transmission service, and be modified more generally by remote commands during a mission.

As a variant, the digital transparent processor DTP 162 may be replaced with a regenerative digital processor in which the telecommunications signals are demodulated.

Figure 6:
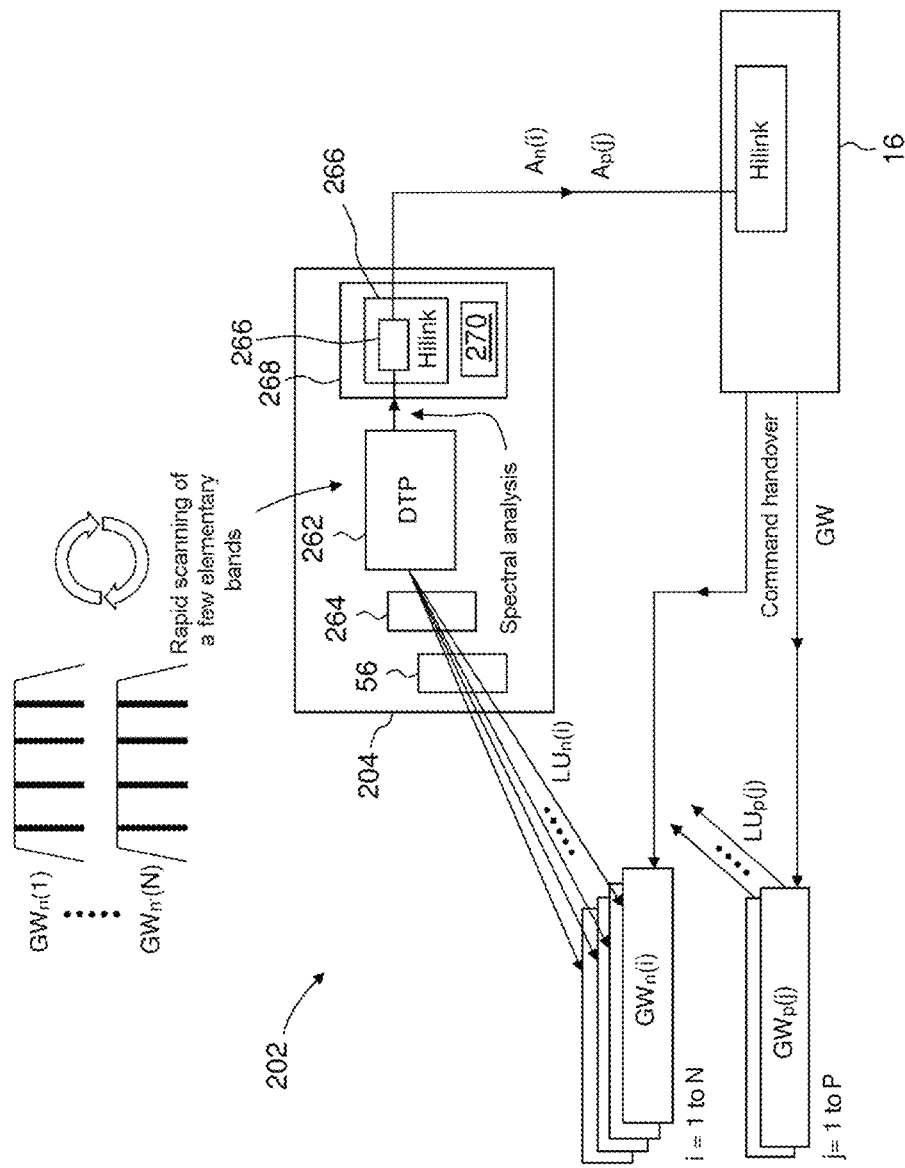
FIG. 6 is a view of the architecture and operation of a second embodiment of the VHTS very high throughput space telecommunications system from FIG. 3.

According to FIG. 6 and a second particular embodiment 202 of the VHTS telecommunications system according to the invention, each first satellite access station GWn(i), i varying from 1 to N, is configured, in a first step, so as to transmit, to the VHTS satellite, a different data traffic signal on its first uplink.

According to this first embodiment of the VHTS space telecommunications system 202, the VHTS telecommunications satellite 4 is a VHTS telecommunications satellite 204 in which the digital transparent processor 62 is a digital transparent processor DTP 262 configured so as to:

measure, in a second step following the first step, for each first uplink LUn(i), varying from 1 to N, a spectral power of the very high throughput traffic signal sent by the first nominal satellite access station GWn(i), through the antenna system 54 and a baseband or intermediate frequency band RF reception and conversion assembly 264; and then transmit, in a third step, the measured spectral powers of the VHTS traffic signals to an estimation computer for estimating the attenuations of the uplinks, located on the ground or on board the satellite, the estimation computer for estimating the attenuations being configured so as to estimate, based on each measured spectral power of the traffic signal on an uplink LUn(i), i varying from 1 to N, a corresponding attenuation level A(i).

Here, in FIG. 6, the estimation computer for estimating the attenuations of the uplinks LUn(i), i varying from 1 to N, denoted by the reference numeral 266, is assumed to be on board the satellite 204. As a variant, the estimation computer for estimating the attenuations of the uplinks LU(i) is located on the ground in the space telecommunications system 2 control and coordination station 16, configured notably so as to manage diversity.

According to FIG. 6, the VHTS very high throughput telecommunications satellite 204 comprises an on-board telemetry subsystem 268.

The on-board telemetry subsystem comprises a conventional first low throughput telemetry device 270 and an auxiliary second high throughput telemetry device 272 (Hilink), dedicated to the remote measurements of the VHTS payload, the auxiliary second high throughput telemetry device 272 including the estimation computer 266 for estimating the attenuations and being configured so as to transmit, to the ground segment, the attenuation levels An(i) of the uplinks LUn(i), varying from 1 to N.

As a variant, the estimation computer for estimating the attenuations of the uplinks LU(i) is located on the ground, for example in the space telecommunications system 2 control and coordination station 16. In this case, the telemetry subsystem 270 is configured so as to transmit the remote measurements of the spectral powers to the estimation computer located on the ground.

According to this variant, the on-board telemetry subsystem may comprise only a conventional first low throughput telemetry device, including the remote measurements of the platform and of the VHTS payload, or comprise a conventional first low throughput telemetry device and an auxiliary second high throughput telemetry device (Hilink) dedicated to the remote measurements of the VHTS payload.

As a variant, the digital transparent processor DTP 262 may be replaced with a regenerative digital processor in which the telecommunications signals are demodulated.

Figure 7:
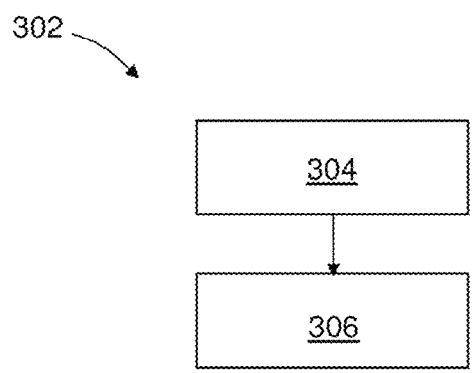
FIG. 7 is a general flowchart of an estimation method according to the invention for estimating, at one and the same given time, a set of attenuations of one or more first very high throughput radiofrequency RF telecommunications uplinks connecting one or more first nominal satellite access stations GWn to one and the same VHTS very high throughput telecommunications satellite.

According to FIG. 7 and in general, an estimation method 302 according to the invention for estimating, at one and the same given time, a set of attenuations of one or more first very high throughput radiofrequency RF telecommunications uplinks connecting one or more first nominal satellite access stations to one and the same VHTS very high throughput telecommunications satellite is implemented by the VHTS space telecommunications system from FIGS. 3 and 4.

The estimation system 302 for estimating the attenuations comprises an auxiliary step 304 of using the digital transparent processor DTP 62 followed by a step 306 of determining the attenuations of the uplinks LUn(i), i varying from 1 to N, of the first nominal satellite access stations GWn(i).

In the auxiliary step 304 of using the digital transparent processor DTP 62, the digital transparent processor DTP 62 generates a common beacon signal or a plurality of different beacon signals and distributes it/them, via a number S of transmission satellite spots in the Q band, greater than or equal to 1 and less than or equal to N, to the N first radiofrequency RF downlinks LDn(i), in order to be measured in terms of power, or the digital transparent processor DTP 62 measures, for each first uplink LUn(i), i varying from 1 to N, a spectral power of the very high throughput traffic signal transmitted by the corresponding first nominal satellite access station GWn(i).

In the step 306 of determining the attenuation levels An(i) of the uplinks LUn(i), the attenuation levels An(i) of the uplinks LUn(i), i varying from 1 to N, corresponding to the first nominal access stations GWn(i), are determined based on the measurements of the powers received on the ground from the one or more beacons transmitted by the digital transparent processor DTP 62, or based, for each first uplink LUn(i), i varying from 1 to N, on the spectral power of the very high throughput traffic signal transmitted by the corresponding first nominal satellite access station GWn(i).

It is recalled that the digital transparent processor DTP 62 may be replaced with a regenerative digital processor in which the telecommunications signals are demodulated.

Figure 8:
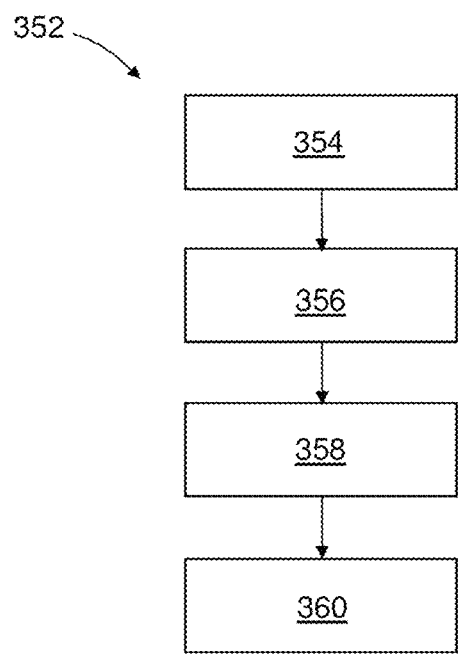
FIG. 8 is a detailed flowchart of a first embodiment of the estimation method from FIG. 7.

According to FIG. 8 and a first embodiment of the estimation method from FIG. 7, a method 352 for estimating, at one and the same given time, a set of attenuations of one or more first very high throughput radiofrequency RF telecommunications uplinks is implemented by the space telecommunications system from FIG. 5.

The method 352 estimating the attenuations according to the first embodiment comprises a first set of steps that are executed in succession.

In a first first step 354, the digital processor DTP 162 generates a common beacon signal or a plurality of different beacon signals.

Then, in a first second step 356, the digital transparent processor DTP 162 routes the one or more beacon signals that are generated to a set of baseband or intermediate frequency band transmission chains that are connected to the transmission satellite spots of the first nominal satellite access stations GWn(i) through output Q-band RF conversion chains.

Next, in a first third step 358, a beacon signal, taken from among the one or more beacon signals, generated and converted into the Q band, is sent to each first satellite access station GWn(i), i varying from 1 to N, through the transmission satellite spot and the first downlink LDn(i) of said first nominal satellite access station GWn(i).

Then, in a first fourth step 360, each first satellite access station GWn(i), i varying from 1 to N, accurately measures the power of the beacon signal transmitted by the satellite on its downlink LDn(i), deduces therefrom the attenuation of the first downlink LDn(i) in the Q band, and then determines, through a conventional predetermined statistical correlation method, an attenuation level An(i) of the corresponding first uplink LUn(i) in the uplink transmission band.

In the implementation of the estimation method 352 according to the first embodiment, the digital transparent processor DTP 162 reuses a multicast module to route the one or more beacon signals that are generated to the set of baseband or intermediate frequency band transmission chains that are connected to the transmission satellite spots of the first nominal satellite access stations through output Q-band RF conversion chains.

The transmission band of the first uplinks of the first access stations is band contained in the Ka band and the V band.

It is recalled that the digital transparent processor DTP 162 may be replaced with a regenerative digital processor in which the telecommunications signals are demodulated.

Figure 9:
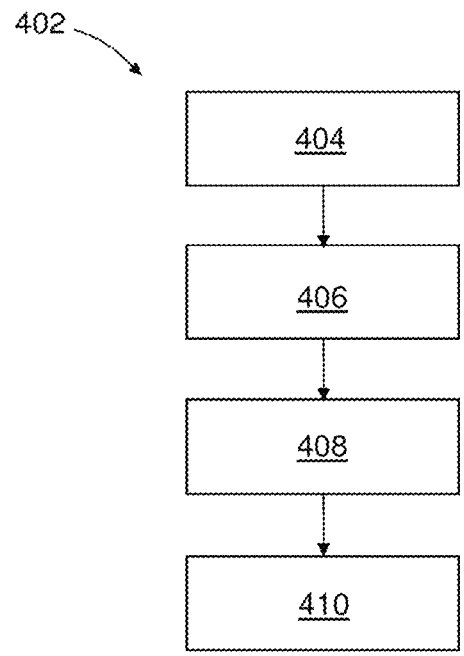
FIG. 9 is a detailed flowchart of a second embodiment of the estimation method from FIG. 7.

According to FIG. 9 and a second embodiment of the estimation method from FIG. 7, a method 402 for estimating, at one and the same given time, a set of attenuations of one or more first very high throughput radiofrequency RF telecommunications uplinks as claimed in claim 1 is implemented by the space telecommunications system from FIG. 6.

The method 402 for estimating the attenuations according to the second embodiment comprises a second set of steps that are executed in succession.

In a second first step 404, each first satellite access station GWn(i), varying from 1 to N, transmits, to the VHTS satellite, a different data traffic signal on its associated first uplink LUn(i).

Then, in a second second step 406, the digital transparent processor DTP 262 measures, for each first uplink LUn(i), i varying from 1 to N, a spectral power of the very high throughput traffic signal sent by the corresponding first nominal satellite access station GWn(i).

Next, in a second third step 408, the digital transparent processor DTP 162 transmits the measured spectral powers of the VHTS traffic signals to an estimation computer 266 for estimating the attenuations of the uplinks, located on the ground or on board the satellite.

Then, in a second fourth step 410, the estimation computer 266 for estimating the attenuations estimates, based on each measured spectral power of the traffic signal on an uplink LUn(i), i varying from 1 to N, a corresponding attenuation level An(i).

In particular, in the second second step 406, only a few elementary bands of the uplink traffic signal transmitted from each first satellite access station GWn(i), for i varying from 1 to N, are measured in terms of spectral power by the digital transparent processor by scanning a predetermined whole number between 1 and 100.

In the second third step 408, the measured spectral powers are for example recovered cyclically with a short period, between 0.05 and 10 seconds, preferably between 0.1 and 1 second, by an on-board telemetry subsystem of the satellite.

When the telemetry subsystem on board the VHTS satellite comprises only a conventional first low throughput telemetry device, including the remote measurements of the platform and of the VHTS payload, or comprises a conventional first low throughput telemetry device and an auxiliary second high throughput telemetry device (Hilink) dedicated to the remote measurements of the VHTS payload, the telemetry subsystem transmits the remote measurements of the spectral powers to the estimation computer, located on the ground.

As a variant, when the telemetry subsystem on board the VHTS satellite comprises a conventional first low throughput telemetry device and an auxiliary second high throughput telemetry device (Hilink) dedicated to the remote measurements of the VHTS payload, the auxiliary second high throughput telemetry device including the estimation computer transmits, to the ground segment, the attenuation levels A(i) of the uplinks LUn(i), i varying from 1 to N.

It is recalled that the digital transparent processor DTP 262 may be replaced with a regenerative digital processor in which the telecommunications signals are demodulated.

This second embodiment 402 of the method for estimating the attenuations of the first uplinks LUn(i), i varying from 1 to N, has the following three main advantages:

it integrates perfectly into the various handover solutions implemented via the digital transparent processor DTP;

it does not require any additional hardware since it makes use of existing functionalities of the digital transparent processor DTP;

it allows a measurement representative, of the signal actually used on the link in the Q/V band, which avoids extrapolating the attenuation to another band far away from the Q/V bands and which is more accurate.

The solution proposed in this second embodiment furthermore has no operational impact or limitation. A single defect or drawback is that of introducing a latency, that is to say a propagation and transmission time. However, this latency is sufficiently low and remains compatible with the budget with regard to the times for preparing and executing the switching.

Figure 10:
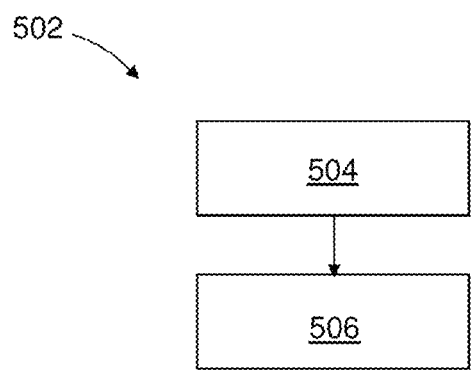
FIG. 10 is, a general flowchart of a method for predicting the switching times for the switching of VHTS very high throughput data traffic from a set of at least one nominal satellite access station to at least one diversity satellite access station.

According to FIG. 10, a method 502 for predicting the switching times for the switching of VHTS very high throughput data traffic from a set of at least one nominal satellite access station to at least one diversity satellite access satellite station, implemented by a VHTS telecommunications system as described in one of FIGS. 3 to 5, comprises;

a step 504 of estimating, at a succession of given times tk, for each time tk, the attenuation level Ank(i) of each nominal satellite access station GWn(i), i varying from 1 to N, the step of estimating the attenuation levels Ank(i) of the uplinks LUn(i) at one and the same time tk being one of the methods 203, 352, 402 described in respective FIGS. 7, 8 and 9: and a step 506 of determining the switching times for the switching of very high throughput data traffic from the set of nominal satellite access stations GWn(i), varying from 1 to N, executed in succession, wherein a decision is made, at each time tk and for each satellite access station GWn(i), i varying from 1 to N, whether or not it is opportune to switch the data traffic on the basis of the attenuation level estimated at the time tk of the uplink LUn(i) of said station GWn(i).

When it is decided, at a time tk0, to switch the traffic for a station GWn(i0), i0 being between 1 and N, the switching time tc(i0) is then a time that is delayed with respect to the time tk0 by a period compatible with the duration to implement diversity with respect to the nominal satellite access station GWn(i0),

The invention claimed is:

1. A method for estimating, at one and the same given time, a set of attenuations of one or more first very high throughput radiofrequency RF telecommunications uplinks connecting one or more first nominal satellite access stations to one and the same VHTS very high throughput telecommunications satellite, the method for estimating the set of one or more attenuations of the one or more first radiofrequency RF uplinks being implemented by a VHTS space telecommunications system comprising:

a VHTS very high throughput telecommunications satellite;

a predetermined whole number N, greater than or equal to 1, of first nominal satellite access stations GWn(i), i being a first index varying from 1 to N; and a predetermined number P, greater than or equal to 1, of second diversity satellite access stations GWp(j), j being a second index varying from 1 to P; and a plurality of user terminals, and a space telecommunications system control and coordination station, configured so as to manage diversity, each first nominal satellite access station GWn(i) having a first very high throughput traffic uplink LUn(i) operating in an uplink transmission band and, in association, a first very high throughput traffic downlink LDn(i) operating in the Q band; and the VHTS space telecommunications satellite comprising a payload having:

an antenna system for generating reception and transmission satellite spots associated with the one or more first and second access stations and transmission and reception spots associated with the user terminals, and a regenerative or digital transparent processor DTP, configured primarily so as to provide high-degree connectivity and high-degree flexibility for the allocation of frequency slots to the reception and transmission satellite spots for the first and second access stations and to the transmission and reception satellite spots for the user terminals, the method for estimating the set of attenuations comprising:

an auxiliary step of using the digital transparent processor DTP, wherein:

the digital processor generates a common beacon signal or a plurality of different beacon signals and distributes it/them, via a number S of transmission satellite spots in the Q band, greater than or equal to 1 and less than or equal to N, to the N one or more first radiofrequency RF downlinks LDn(i), i varying from 1 to N, in order to be measured in terms of power, or the digital processor measures, for each first uplink LUn (i), i varying from 1 to N, a spectral power of the very high throughput traffic signal received by the satellite corresponding to the traffic signal transmitted by the corresponding first nominal satellite access station GWn(i); and a following step of determining the attenuation levels An(i) of the uplinks, i varying from 1 to N, based on the powers of the beacon signal or signals measured by the one or more first nominal access stations GWn(i), or based on the one or more spectral powers, measured by the digital processor, of the traffic signals received by the satellite and transmitted by the one or more first nominal access stations GWn(i).

2. The method for estimating, at one and the same given time, a set of attenuations of one or more first very high throughput radiofrequency RF telecommunications uplinks as claimed in claim 1, comprising, according to a first type of estimation:

a first first step wherein the digital processor generates a common beacon signal or a plurality of different beacon signals, and then a first second step wherein the digital processor routes the one or more beacon signals that are generated to a set of baseband or intermediate frequency band transmission chains that are connected to the transmission satellite spots of the first nominal satellite access stations GWn(i), i varying from 1 to N, through output Q-band RF conversion chains; and then a first third step wherein a beacon signal, taken from among the one or more beacon signals, generated and converted into the Q band, is sent to each first satellite access station GWn(i), i varying from 1 to N, through the transmission satellite spot and the first downlink LDn(i) of said first nominal satellite access station GWn(i); and then a first fourth step wherein each first satellite access station GWn(i), i varying from 1 to N, accurately measures the power of the beacon signal transmitted by the satellite on its downlink LDn(i), deduces therefrom the attenuation of the first downlink in the Q band, and then determines, through a predetermined statistical correlation method, an attenuation level An(i) of the corresponding first uplink LUn(i) in the uplink transmission band.

3. The method for estimating, at one and the same given time, a set of attenuations of one or more first very high throughput radiofrequency RF telecommunications uplinks as claimed in claim 2, wherein the digital processor reuses a multicast module to route the one or more beacon signals that are generated to the set of baseband or intermediate frequency band transmission chains that are connected to the transmission satellite spots of the first nominal satellite access stations through output Q-band RF conversion chains.

4. The method for estimating, at one and the same given time, a set of attenuations of one or more first very high throughput radiofrequency RF telecommunications uplinks as claimed in claim 2, wherein the transmission band of the first uplinks of the first access stations is a band contained in the Ka band and the V band.

5. The method for estimating, at one and the same given time, a set of attenuations of one or more first very high throughput radiofrequency RF telecommunications uplinks as claimed in claim 1, comprising, according to a second type of estimation:
a second first step wherein each first satellite access station GWn(i), i varying from 1 to N, transmits, to the VHTS satellite, a different data traffic signal on its first uplink LUn(i); and then
a second second step wherein the digital processor measures, for each first uplink LUn(i), i varying from 1 to N, a spectral power of the very high throughput traffic signal sent by the corresponding first nominal satellite access station GWn(i); and then
a second third step wherein the digital processor transmits the measured spectral powers of the VHTS traffic signals to an estimation computer for estimating the attenuations of the uplinks LUn(i), i varying from 1 to N, the estimation computer being located on the ground or on board the satellite; and then
a second fourth step wherein the estimation computer for estimating the attenuations estimates, based on each measured spectral power of the traffic signal on an uplink LUn(i), i varying from 1 to N, a corresponding attenuation level An(i).

6. The method for estimating, at one and the same given time, a set of attenuation levels of one or more first very high throughput radiofrequency RF telecommunications uplinks as claimed in claim 5, wherein,
in the second second step, only a few elementary bands of the uplink traffic signal transmitted from each first satellite access station GWn(i), for i varying from 1 to N, are measured in terms of spectral power by the digital transparent processor by scanning a predetermined whole number between 1 and 100, and/or,
in the second third step, the measured spectral powers are recovered cyclically with a short period, between 0.05 and 10 seconds, preferably between 0.1 and 1 second, by an on-board telemetry subsystem of the satellite.

7. The method for estimating, at one and the same given time, a set of attenuations of one or more first very high throughput radiofrequency RF telecommunications uplinks as claimed in claim 6, wherein,
when the spectral powers measured by the digital processor are cyclically recovered by an on-board telemetry subsystem of the satellite,
the on-board telemetry subsystem comprises only a conventional first low throughput telemetry device, including the remote measurements of the platform and of the VHTS payload, or comprises a conventional first low throughput telemetry device and an auxiliary second high throughput telemetry device (Hilink) dedicated to the remote measurements of the VHTS payload, the telemetry subsystem being configured so as to transmit the remote measurements of the spectral powers to the estimation computer, located on the ground, or
the on-board telemetry subsystem comprises a conventional first low throughput telemetry device and an auxiliary second high throughput telemetry device (Hilink) dedicated to the remote measurements of the VHTS payload, the auxiliary second high throughput telemetry device including the estimation computer and being configured so as to transmit the computed attenuation levels A(i) of the uplinks LUn(i), i varying from 1 to N, to the ground.

8. A method for predicting the switching times for the switching of VHTS very high throughput data traffic from a set of at least one nominal satellite access station to at least one diversity satellite access satellite station,
the method for predicting the switching times for the switching of VHTS very high throughput data traffic from a set of nominal satellite access stations being implemented by a VHTS very high throughput space telecommunications system comprising:
a VHTS very high throughput telecommunications satellite;
a predetermined whole number N, greater than or equal to 1, of first nominal satellite access stations GWn(i), i being a first index varying from 1 to N; and
a predetermined number P, greater than or equal to 1, of second diversity satellite access stations GWp(j), j being a second index varying from 1 to P; and
a plurality of user terminals; and
a space telecommunications system control and coordination station, configured so as to manage diversity;
each first nominal satellite access station GWn(i) having a first very high throughput traffic uplink LUn(i) operating in an uplink transmission band and, in association, a first very high throughput traffic downlink LDn(i) operating in the Q band; and
each second diversity satellite access station GWp(j), j varying from 1 to P, having a second very high throughput traffic nominal uplink LUp(j) operating in an uplink transmission band and, in association, a second very high throughput traffic downlink operating in the Q band;
the method for predicting the switching times for the switching of very high throughput data traffic from a set of nominal satellite access stations to at least one diversity satellite access satellite station comprising:
a step of estimating, at a succession of given times tk, for each time tk, the attenuation level Ank(i) of each first nominal satellite access station GWn(i), i varying from 1 to N, the step of estimating the attenuation levels Ank(i) of the uplinks LUn(i) at one and the same time tk being defined by claim 1, and then
a step of determining the switching times for the switching of very high throughput data traffic from the set of nominal satellite access stations GWn(i), i varying from 1 to N, wherein a decision is made, at each time tk and for each nominal satellite access station GWn(i), i varying from 1 to N, whether or not it is opportune to switch the data traffic on the basis of the attenuation level Ank(i) estimated at the time tk of the uplink LUn(i) of said corresponding first nominal station GWn(i).

9. The method for predicting the switching times for the switching of VHTS very high throughput data traffic from a set of at least one nominal satellite access station to at least one diversity satellite access satellite station as claimed in claim 8, wherein,
when it is decided, at a time tk0, to switch the traffic for a station GWn(i0), i0 being between 1 and N, the switching time tc(i0) is then a time that is delayed with respect to the time tk0 by a period compatible with the duration to implement diversity with respect to the nominal satellite access station GWn(i0).

10. A VHTS very high throughput space telecommunications system for estimating, at one and the same given time, a set of attenuation levels of one or more first very high throughput radiofrequency RF telecommunications uplinks connecting one or more first nominal satellite access stations to one and the same VHTS very high throughput telecommunications satellite, comprising:
a VHTS very high throughput telecommunications satellite;
a predetermined whole number N, greater than or equal to 1, of first nominal satellite access stations GWn(i), i being a first index varying from 1 to N; and
a plurality of user terminals, and
a space telecommunications system control and coordination station, configured so as to manage diversity;
each first nominal satellite access station GWn(i) having a first very high throughput traffic uplink LUn(i) operating in an uplink transmission band and, in association, a first very high throughput traffic downlink LDn(i) operating in the Q band; and
the VHTS telecommunications satellite comprising a payload having:
an antenna system for generating reception and transmission satellite spots associated with the one or more first nominal access stations and transmission and reception spots associated with the user terminals, and
a regenerative or digital transparent processor DTP, configured primarily so as to provide high-degree connectivity and high-degree flexibility for the allocation of frequency slots to the reception and transmission satellite spots for the one or more first nominal access stations and to the transmission and reception satellite spots for the user terminals,
the VHTS very high throughput space telecommunications system wherein:
the digital processor is configured so as to generate a common beacon signal or a plurality of different beacon signals and distributes it/them, via a number S of transmission satellite spots in the Q band, greater than or equal to 1 and less than or equal to N, to the N first radiofrequency RF downlinks LDn(i), i varying from 1 to N, in order to be measured in terms of power, or
the digital processor is configured so as to measure, for each first nominal satellite access station GWn(i), i varying from 1 to N, a spectral power of the very high throughput traffic signal transmitted on the associated first uplink LUn(i).

11. The VHTS very high throughput space telecommunications system as claimed in claim 10, wherein
the digital processor is configured so as to generate, in a first step, a common beacon signal or a plurality of different beacon signals, and then, in a first second step, route the one or more beacon signals that are generated to a set of baseband or intermediate frequency band transmission chains that are connected to the transmission satellite spots of the first nominal satellite access stations GWn(i), i varying from 1 to N, through output Q-band RF conversion chains; and
the antenna system for generating reception and transmission satellite spots associated with the one or more first nominal access stations is configured so as to send, in a first third step, a beacon signal, taken from among the one or more beacon signals, generated and converted into the Q band, to each first satellite access station GWn(i), i varying from 1 to N, through the transmission satellite spot and the first downlink LD(i) of said first nominal satellite access station GWn(i); and
each first satellite access station GWn(i), i varying from 1 to N, is configured so as to accurately measure, in a first fourth step, the power of the beacon signal transmitted by the satellite on its downlink LDn(i), and deduce therefrom the attenuation of the first downlink in the Q band, and then determine, through a predetermined statistical correlation method, an attenuation level An(i) of the corresponding first uplink LU(i) in the uplink transmission band.

12. The VHTS very high throughput space telecommunications system as claimed in claim 10, wherein
each first satellite access station GWn(i), i varying from 1 to N, is configured, in a second first step, so as to transmit, to the VHTS satellite, a different data traffic signal on its first uplink LUn(i); and then
the digital processor is configured so as to
measure, in a second second step following the first step, for each first uplink LUn(i), i varying from 1 to N, a spectral power of the very high throughput traffic signal sent by the first nominal satellite access station GWn(i), and then
transmit, in a second third step, the measured spectral powers of the VHTS traffic signals to an estimation computer for estimating the attenuations of the uplinks, located on the ground or on board the satellite, the estimation computer for estimating the attenuations being configured so as to estimate, based on each measured spectral power of the traffic signal on an uplink LUn(i), i varying from 1 to N, a corresponding attenuation level An(i).

13. The VHTS very high throughput space telecommunications system as claimed in claim 10, wherein the VHTS very high throughput telecommunications satellite comprises an on-board telemetry subsystem,
the on-board telemetry subsystem comprising only a conventional first low throughput telemetry device, including the remote measurements of the platform and of the VHTS payload, or comprising a conventional first low throughput telemetry device and an auxiliary second high throughput telemetry device (Hilink) dedicated to the remote measurements of the VHTS payload, and the telemetry subsystem being configured so as to transmit the remote measurements of the spectral powers to the estimation computer, located on the ground; or
the on-board telemetry subsystem comprising a conventional first low throughput telemetry device and an auxiliary second high throughput telemetry device (Hi-link) dedicated to the remote measurements of the VHTS payload, the auxiliary second high throughput telemetry device including the estimation computer and being configured so as to transmit the attenuation levels $An(i)$ of the uplinks $LUn(i)$, i varying from 1 to N, to the ground.

14. The VHTS very high throughput space telecommunications system as claimed in claim 10, furthermore comprising a predetermined number P, greater than or equal to 1, of second diversity satellite access stations $GWp(j)$, j being a second index varying from 1 to P; and wherein the antenna system is configured so as to generate reception and transmission satellite spots associated with the one or more first and second access stations $GWn(i)$, $GWp(j)$ and transmission and reception spots associated with the user terminals, and the space telecommunications system and diversity management control and coordination station is configured so as to predict switching times for the switching of very high throughput data traffic from a set of nominal satellite access stations to at least one diversity satellite access station by receiving the estimates, at a succession of given times $tk$, for each time $tk$, of the attenuation level $Ank(i)$ of each first nominal satellite access station $GWn(i)$, i varying from 1 to N, and then by determining the switching times for the switching of very high throughput data traffic from the set of first nominal satellite access stations $GWn(i)$, i varying from 1 to N, by deciding, at each time $tk$ and for each satellite access station $GWn(i)$, i varying from 1 to N, whether or not it is opportune to switch the data traffic on the basis of the attenuation level $Ank(i)$ estimated at the time $tk$ of the uplink $LUn(i)$ of said first nominal station $GWn(i)$.

* * * * *